United States Patent
Wu (10) Patent No.: US 10,133,167 B2
(45) Date of Patent: Nov. 20, 2018

(54) PROJECTION APPARATUS AND LIGHT SOURCE MODULE

(71) Applicant: Coretronic Corporation, Hsin-Chu (TW)

(72) Inventor: Jian-Jiun Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/903,030

(22) Filed: Feb. 23, 2018

(65) Prior Publication Data
US 2018/0239231 A1 Aug. 23, 2018

(30) Foreign Application Priority Data
Feb. 23, 2017 (CN) .......................... 2017 1 0100362

(51) Int. Cl.
| | | |
|---|---|---|
| G03B 21/20 | (2006.01) | |
| H04N 5/74 | (2006.01) | |
| F21V 23/06 | (2006.01) | |
| F21V 25/00 | (2006.01) | |

(52) U.S. Cl.
CPC ............ *G03B 21/206* (2013.01); *F21V 23/06* (2013.01); *F21V 25/00* (2013.01); *H04N 5/7416* (2013.01); *H04N 2005/745* (2013.01); *H04N 2005/7466* (2013.01)

(58) Field of Classification Search
CPC ....... G03B 21/206; F21V 23/06; F21V 25/00; H04N 5/7416; H04N 2005/745; H04N 2005/7466
See application file for complete search history.

(56) References Cited

U.S. PATENT DOCUMENTS

| | | | | |
|---|---|---|---|---|
| 2009/0085489 A1* | 4/2009 | Chang | ................ | H05B 33/0827 315/193 |
| 2009/0236994 A1* | 9/2009 | Deurenberg | ....... | H05B 33/0818 315/152 |
| 2011/0109228 A1* | 5/2011 | Shimomura | ....... | H05B 37/0245 315/113 |
| 2013/0301013 A1* | 11/2013 | Samejima | .......... | G03B 21/2033 353/52 |
| 2014/0177664 A1 | 6/2014 | Osterried | | |

FOREIGN PATENT DOCUMENTS

| | | |
|---|---|---|
| CN | 2927114 Y | 7/2007 |
| CN | 102696282 | 9/2012 |
| JP | 2013238635 | 11/2013 |
| TW | 200527108 | 8/2005 |
| TW | 200810607 | 2/2008 |
| TW | 200915261 | 4/2009 |
| TW | 201728025 | 8/2017 |

* cited by examiner

*Primary Examiner* — Sultan Chowdhury
*Assistant Examiner* — Magda Cruz
(74) *Attorney, Agent, or Firm* — JCIPRNET (57) ABSTRACT

A projection apparatus and a light source module are provided. The light source module includes a light-emitting element string, a shunt module, and a control circuit. A first shunt circuit, a second shunt circuit, and a third shunt circuit of the shunt module are coupled to the light-emitting element string, and are adapted to provide a first shunt path, a second shunt path or a third shunt path, such that the light-emitting element string is still maintained to normally work when a light-emitting element/light-emitting elements is/are malfunctioned.

12 Claims, 8 Drawing Sheets

PROJECTION APPARATUS AND LIGHT SOURCE MODULE

CROSS-REFERENCE TO RELATED APPLICATION

This application claims the priority benefit of China application serial no. 201710100362.1, filed on Feb. 23, 2017. The entirety of the above-mentioned patent application is hereby incorporated by reference herein and made a part of this specification.

BACKGROUND OF THE INVENTION

Field of the Invention

The invention relates to an electronic apparatus, and particularly relates to a projection apparatus and a light source module.

Description of Related Art

It has advantages of a long service life, power saving, etc., to use a laser diode string to serve as a light source module, However, the service life of each laser diode in the laser diode string is not consistent, once a laser diode/laser diodes is/are malfunctioned after a period of use, the laser diode string cannot provide a light beam. Regarding the laser diode string applied to a projection apparatus/projector or a display to serve as a light source for producing light beam, projection quality of the projection apparatus is affected.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection apparatus and a light source module. When a light-emitting element of a light-emitting element string is malfunctioned, a problem of being unable to provide light beam is mitigated/improved, so as to improve projection quality of the projection apparatus and optical quality of the light source module.

Other objects and advantages of the invention can be further illustrated by the technical features broadly embodied and described as follows.

In order to achieve one or a portion of or all of the objects or other objects, an embodiment of the invention provides a projection apparatus including a light source module, a light valve, and a projection lens. The light source module is adapted to provide an illumination beam, and the light source module includes a light-emitting element string, a shunt module, and a control circuit. The light-emitting element string has a first light-emitting portion, a second light-emitting portion, and a third light-emitting portion. The first light-emitting portion, the second light-emitting portion, and the third light-emitting portion include a plurality of light-emitting elements connected in series. The shunt module is coupled to the light-emitting element string, and the shunt module includes a first shunt circuit, a second shunt circuit, and a third shunt circuit. The first shunt circuit is connected in parallel with the first light-emitting portion to form a pair of first connection nodes on the light-emitting element string, and is adapted to provide a first shunt path. The second shunt circuit is connected in parallel with the second light-emitting portion to form a pair of second connection nodes on the light-emitting element string, and is adapted to provide a second shunt path. The third shunt circuit is connected in parallel with the third light-emitting portion to form a pair of third connection nodes on the light-emitting element string, and is adapted to provide a third shunt path. At least one light-emitting element between the pair of the first connection nodes, at least one light-emitting element between the pair of the second connection nodes, and at least one light-emitting element between the pair of the third connection nodes are not completely the same. The control circuit is coupled to the light-emitting element string, the first shunt circuit, the second shunt circuit, and the third shunt circuit, and is adapted to control the first shunt circuit, the second shunt circuit or the third shunt circuit to provide the first shunt path, the second shunt path or the third shunt path according to an output current of the light-emitting element string. The light-emitting element string is adapted to provide the illumination beam through the first shunt path, the second shunt path or the third shunt path. The light valve is located on a transmission path of the illumination beam, and is adapted to convert the illumination beam into an image beam. The projection lens is located on a transmission path of the image beam.

An embodiment of the invention provides a light source module. The light source module includes a light-emitting element string, a shunt module, and a control circuit. The light-emitting element string has a first light-emitting portion, a second light-emitting portion, and a third light-emitting portion. The first light-emitting portion, the second light-emitting portion, and the third light-emitting portion include a plurality of light-emitting elements connected in series. The shunt module is coupled to the light-emitting element string, and the shunt module includes a first shunt circuit, a second shunt circuit, and a third shunt circuit. The first shunt circuit is connected in parallel with the first light-emitting portion to form a pair of first connection nodes on the light-emitting element string, and is adapted to provide a first shunt path. The second shunt circuit is connected in parallel with the second light-emitting portion to form a pair of second connection nodes on the light-emitting element string, and is adapted to provide a second shunt path. The third shunt circuit is connected in parallel with the third light-emitting portion to form a pair of third connection nodes on the light-emitting element string, and is adapted to provide a third shunt path. At least one light-emitting element between the pair of the first connection nodes, at least one light-emitting element between the pair of the second connection nodes, and at least one light-emitting element between the pair of the third connection nodes are not completely the same. The control circuit is coupled to the light-emitting element string, the first shunt circuit, the second shunt circuit, and the third shunt circuit, and is adapted to control the first shunt circuit, the second shunt circuit or the third shunt circuit to provide the first shunt path, the second shunt path or the third shunt path according to an output current of the light-emitting element string.

According to the above description, in the embodiment of the invention, by using the first shunt circuit, the second shunt circuit, and the third shunt circuit coupled to the light-emitting element string to provide the shunt path(s) to guide current to the light-emitting element(s) that are not malfunctioned for emitting light beam, the problem that the light-emitting element string is unable to provide the light beam due to malfunction of a light-emitting element/light-emitting elements in the light-emitting element string is avoided and/or brightness attenuation caused by malfunction of a light-emitting element/light-emitting elements is mitigated, so as to effectively improve the projection quality of the projection apparatus and the optical quality of the light source module.

In order to make the aforementioned and other features and advantages of the invention comprehensible, several exemplary embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
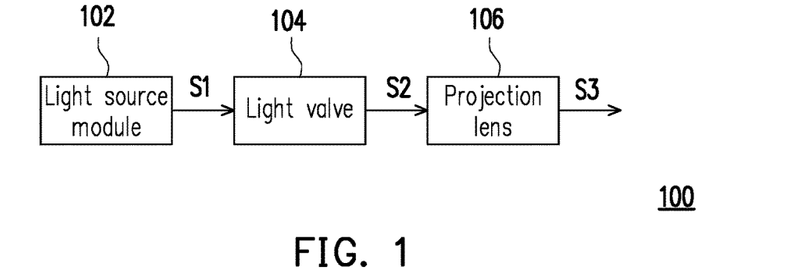
FIG. 1 is a schematic diagram of a projection apparatus according to an embodiment of the invention.

FIG. 1 is a schematic diagram of a projection apparatus according to an embodiment of the invention. Referring to FIG. 1, in the embodiment, the projection apparatus 100 includes a light source module 102, a light valve 104, and a projection lens 106. In the embodiment, the light source module 102 is, for example, a light source device, the light valve 104 is, for example, a digital micromirror device (DMD), a liquid crystal display (LCD) light valve, a liquid crystal on silicon (LCos) light valve. In the embodiment, the light valve 104 is disposed/located between the light source module 102 and the projection lens 106. In the embodiment, the light source module 102 may provide an illumination beam S1. In the embodiment, the light valve 104 is disposed/located on a transmission path of the illumination beam S1, and is adapted to convert the illumination beam S1 into an image beam S2. In the embodiment, the projection lens 106 is disposed/located on a transmission path of the image beam S2, and is adapted to convert the image beam S2 into a projection beam S3, and projects the projection beam S3 onto a screen (not shown), so as to display a projection image on the screen.

Figure 2:
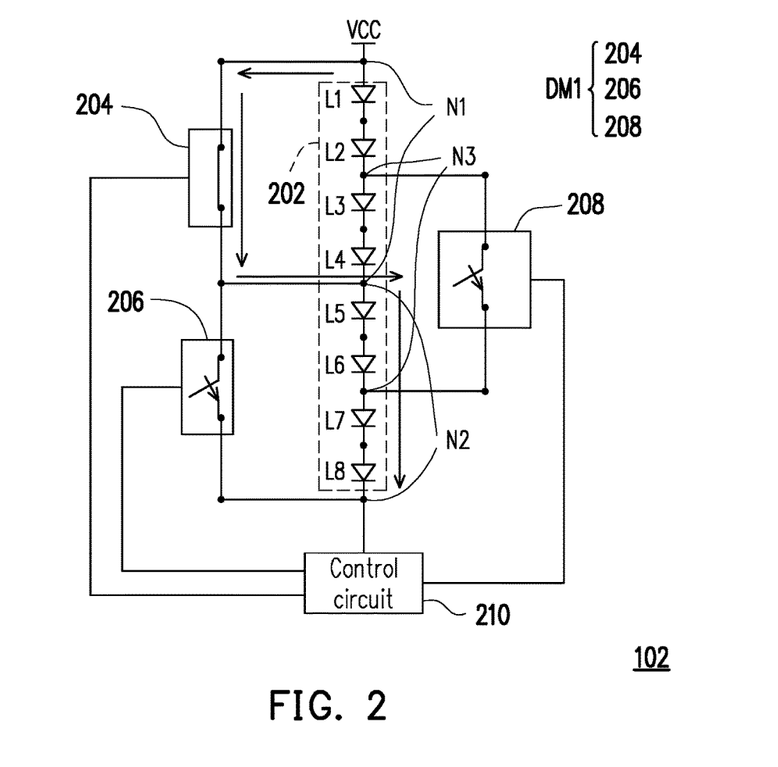
FIG. 2 is a schematic diagram of a light source module according to an embodiment of the invention.

FIG. 2 is a schematic diagram of a light source module according to an embodiment of the invention. Referring to FIG. 2, in the embodiment, the light source module 102 includes a light-emitting element string 202, a shunt module DMI, and a control circuit 210. In the embodiment, the control circuit 210 is coupled to the light-emitting element string 202, and the light-emitting element string 202 is coupled between a voltage source used for providing an operation voltage VCC and the control circuit 210. In the embodiment, the light-emitting element string 202 has a first light-emitting portion, a second light-emitting portion, and a third light-emitting portion (which are described later). The first light-emitting portion includes at least one first light-emitting element, the second light-emitting portion includes at least one second light-emitting element, and the third light-emitting portion includes at least one third light-emitting element. To be specific, in the embodiment, the light-emitting element string 202 includes the first light-emitting portion composed of light-emitting elements L1, L2, L3, and L4 (for example, the first light-emitting elements) connected in series, the second light-emitting portion composed of light-emitting elements L5, L6, L7, and L8 (for example, the second light-emitting elements) connected in series, and the third light-emitting portion composed of the light-emitting elements L3, L4, L5, and L6 (for example, the third light-emitting elements) connected in series. In the embodiment, the light-emitting elements L1-L8 are, for example, implemented by laser diodes, though the invention is not limited thereto; for example, the light-emitting elements L1-L8 may also be implemented by light-emitting diodes (LED), bulbs, or other light-emitting electronic elements. In the embodiment, the shunt module DMI may include a first shunt circuit 204, a second shunt circuit 206, and a third shunt circuit 208. In the embodiment, the first shunt circuit 204 is connected in parallel with the first light-emitting portion (i.e. the light-emitting elements L1, L2, L3, and L4 connected in series) to form a pair of first connection nodes N1 (i.e. two first connection nodes N1) on the light-emitting element string 202; the second shunt circuit 206 is connected in parallel with the second light-emitting portion (i.e. the light-emitting elements L5, L6, L7, and L8 connected in series) to form a pair of second connection nodes N2 (i.e. two second connection nodes N2) on the light-emitting element string 202; the third shunt circuit 208 is connected in parallel with the third light-emitting portion (i.e. the light-emitting elements L3, L4, L5, and L6 connected in series) to form a pair of third connection nodes N3 (i.e. two third connection nodes N3) on the light-emitting element string 202. Moreover, in the embodiment, the control circuit 210 is coupled to the first shunt circuit 204, the second shunt circuit 206, and the third shunt circuit 208. In the embodiment, the control circuit 210 is adapted to control the first shunt circuit 204, the second shunt circuit 206 or the third shunt circuit 208 to provide a first shunt path, a second shunt path or a third shunt path according to an output current of the light-emitting element string 202, so as to guide the current to the light-emitting elements of the light-emitting element string 202 that are not malfunctioned, and avoid the problem that all of the light-emitting elements in the light-emitting element string 202 cannot emit light due to malfunction of a part of the light-emitting elements of the light-emitting element string 202. In brief, the control circuit 210 may control the first shunt circuit 204 to provide the first shunt path, and control the second shunt circuit 206 to provide the second shunt path, and control the third shunt circuit 208 to provide the third shunt path. In the embodiment, as shown in FIG. 2, the control circuit 210, for example, controls the first shunt circuit 204 to provide the first shunt path, and controls the second shunt circuit 206 not to provide the second shunt path, and controls the third shunt circuit 208 not to provide the third shunt path.

For example, as shown in FIG. 2, the first shunt circuit 204, the second shunt circuit 206, and the third shunt circuit 208 may be implemented by switches. In the embodiment, when the control circuit 210 detects that the output current of the light-emitting element string 202 is zero, it represents that at least one light-emitting element in the light-emitting element string 202 is malfunctioned, such that the current may not pass through each of the light-emitting elements L1-L8. In the embodiment, the control circuit 210, for example, alternately turns on the first shunt circuit 204, the second shunt circuit 206, and the third shunt circuit 208, and alternately provides the first shunt path, the second shunt path, and the third shunt path, such that the light-emitting element string 202 may still maintain a normal operation. For example, in the embodiment of FIG. 2, if the malfunctioned light-emitting element is at least one of the light-emitting elements L1-L4, the control circuit 210 may turn on the first shunt circuit 204 to provide the first shunt path, and does not turn on the second shunt circuit 206 and the third shunt circuit 208, such that the current may pass through a current path of the first shunt circuit 204 and the light-emitting elements L5-L8 for outputting to the control circuit 210. When the control circuit 210 detects that the output current of the light-emitting element string 202 is not zero, it represents that the malfunctioned light-emitting element no longer prevents the light-emitting element string 202 from providing the illumination beam S1, therefore the control circuit 210 may stop trying to turn on other shunt circuits, or may stop alternately turning on the first shunt circuit 204, the second shunt circuit 206, and the third shunt circuit 208. Deduced by analogy, in other embodiment that is not illustrated, if the malfunctioned light-emitting element is at least one of the light-emitting elements L5-L8, the control circuit 210 may turn on the second shunt circuit 206 to provide the second shunt path, and does not turn on the first shunt circuit 204 and the third shunt circuit 208, such that the current may pass through a current path of the light-emitting elements L1-L4 and the second shunt circuit 206 for outputting to the control circuit 210. In other embodiment that is not illustrated, if the malfunctioned light-emitting element is at least one of the light-emitting elements L3-L6, the control circuit 210 may turn on the third shunt circuit 208 to provide the third shunt path, and does not turn on the first shunt circuit 204 and the second shunt circuit 206, such that the current may pass through a current path of the light-emitting elements L1-L2, the third shunt circuit 208 and the light-emitting elements L7-L8 for outputting to the control circuit 210.

According to the aforementioned embodiment, it is known that by using the first shunt circuit 204 coupled to the light-emitting element string 202 to provide the first shunt path, or using the second shunt circuit 206 coupled to the light-emitting element string 202 to provide the second shunt path, or using the third shunt circuit 208 coupled to the light-emitting element string 202 to provide the third shunt path, the current may be provided to the non-malfunctioned light-emitting elements to emit light. Moreover, according to the aforementioned embodiment, even if most of the light-emitting elements are malfunctioned, the light-emitting element string 202 is still maintained to continually provide the illumination beam S1, so as to make an effective use of the light-emitting element string 202. In this way, the problem that the light-emitting element string is unable to work or the problem of brightness attenuation caused by malfunction of a part of the light-emitting elements is greatly mitigated, so as to effectively improve the projection quality of the projection apparatus. In other embodiment that is not illustrated, a current driver may be further adapted to compensate the brightness attenuation caused by the malfunctioned light-emitting elements, such that the light-emitting element string 202 having the malfunctioned light-emitting elements may still maintain a light-emitting brightness as that when the malfunction is not occurred. Moreover, in some embodiments, the light source module 102 may further include a storage memory adapted to store/record malfunction information of the light-emitting elements in the light-emitting element string 202 to serve as reference information for future maintenance/improvement of the light source module 120 or the projection uppercuts 100. Moreover, big data analysis may be performed to the stored/recorded malfunction information to further obtain a big data database.

Operation status of the light-emitting element string 202 when the light-emitting elements are malfunctioned is described below with reference of a following table one.

TABLE one

| Number of statuses of malfunction | Malfunctioned light-emitting element(s) |
|---|---|
| $C_1^8 = 8$ | L1  L2  L3  L4  L5  L6  L7  L8 |
| $C_2^8 = 28$ | L1  L1  L1  L1  L1  L1  L1<br>L2  L3  L4  L5  L6  L7  L8<br>L2  L2  L2  L2  L2  L2<br>L3  L4  L5  L6  L7  L8<br>L3  L3  L3  L3  L3<br>L4  L5  L6  L7  L8<br>L4  L4  L4  L4<br>L5  L6  L7  L8<br>L5  L5  L5<br>L6  L7  L8<br>L6  L6<br>L7  L8<br>L7<br>L8 |
| $C_3^8 = 56$ | L1  L1  L1  L1  L1  L1<br>L2  L2  L2  L2  L2  L2<br>L3  L4  L5  L6  L7  L8<br>L1  L1  L1  L1  L1<br>L3  L3  L3  L3  L3<br>L4  L5  L6  L7  L8<br>L1  L1  L1  L1<br>L4  L4  L4  L4<br>L5  L6  L7  L8<br>L1  L1  L1<br>L5  L5  L5<br>L6  L7  L8<br>L1  L1<br>L6  L6<br>L7  L8<br>L1<br>L7<br>L8<br>L2  L2  L2  L2<br>L3  L3  L3  L3<br>L4  L5  L6  L7  L8<br>L2  L2  L2  L2<br>L4  L4  L4  L4<br>L5  L6  L7  L8<br>L2  L2  L2<br>L5  L5  L5<br>L6  L7  L8<br>L2  L2<br>L6  L6<br>L7  L8<br>L2<br>L7<br>L8<br>L3  L3  L3  L3<br>L4  L4  L4  L4<br>L5  L6  L7  L8<br>L3  L3  L3<br>L5  L5  L5<br>L6  L7  L8<br>L3  L3<br>L6  L6<br>L7  L8<br>L3<br>L7<br>L8<br>L4  L4  L4<br>L5  L5  L5<br>L6  L7  L8<br>L4  L4<br>L6  L6<br>L7  L8<br>L4<br>L7<br>L8<br>L5  L5<br>L6  L6<br>L7  L8<br>L5<br>L7<br>L8<br>L6<br>L7<br>L8 |

The light-emitting element string 202, for example, has 8 light-emitting elements L1-L8 (though the invention is not limited thereto), when the number of the malfunctioned light-emitting element is one, i.e. the malfunctioned light-emitting element is probably L1, L2, L3, L4, L5, L6, L7 or L8, i.e. the number of statuses of malfunction is 8, where when the malfunctioned light-emitting element is L1 or L2, the light-emitting element string 202 may still normally work through the second shunt path or the third shunt path; when the malfunctioned light-emitting element is L3 or L4, the light-emitting element string 202 may still normally work through the second shunt path; when the malfunctioned light-emitting element is L5 or L6, the light-emitting element string 202 may still normally work through the first shunt path; and when the malfunctioned light-emitting element is L7 or L8, the light-emitting element string 202 may still normally work through the first shunt path or the third shunt path. In brief, when the number of the malfunctioned light-emitting element is one, a chance of maintaining a normal operation of the light-emitting element string 202 is 100%.

Continually referring to the table one, in the embodiment, when the number of the malfunctioned light-emitting elements is two, it is known that the number of statuses of malfunction is 28 according to the table one. In the embodiment, when the malfunctioned light-emitting elements are L1 and L2, the light-emitting element string 202 may still normally work through the second shunt path or the third shunt path. In the embodiment, when the malfunctioned light-emitting elements are L1 and L3 at the same time, or are L1 and L4 at the same time, or are L2 and L3 at the same time, or are L2 and L4 at the same time, the light-emitting element string 202 may still normally work through the second shunt path. In the embodiment, when the malfunctioned light-emitting elements are L1 and L7 at the same time, or are L1 and L8 at the same time, or are L2 and L7 at the same time, or are L2 and L8 at the same time, the light-emitting element string 202 may still normally work through the third shunt path. In the embodiment, when the malfunctioned light-emitting elements are L3 and L4 at the same time, or are L5 and L6 at the same time, the light-emitting element string 202 may still normally work through the first shunt path or the second shunt path. In the embodiment, when the malfunctioned light-emitting elements are L5 and L7 at the same time, or are L5 and L8 at the same time, or are L6 and L7 at the same time, or are L6 and L8 at the same time, the light-emitting element string 202 may still normally work through the first shunt path. In the embodiment, when the malfunctioned light-emitting elements are L7 and L8, the light-emitting element string 202 may still normally work through the first shunt path or the third shunt path. According to the above description, it is known that when the number of the malfunctioned light-emitting elements is two (i.e. the number of statuses of malfunction is 28), the light-emitting element string 202 may still normally work through the first shunt path, the second shunt path or the third shunt path under the number of statuses of malfunction of 16, i.e. the chance of normal operation of the light-emitting element string 202 is 57%. In brief, even if the number of the malfunctioned light-emitting elements is two, the chance of normal operation of the light-emitting element string 202 is still more than 50%.

Continually referring to the table one, in the embodiment, when the number of the malfunctioned light-emitting elements is three, it is known that the number of statuses of malfunction is 56 according to the table one. In the embodiment, when the malfunctioned light-emitting elements are L1, L2, and L3 at the same time, or are L1, L2, and IA at the same time, or are L1, L3, and L4 at the same time, or are L2, L3, and L4 at the same time, the light-emitting element string 202 may still normally work through the second shunt path. In the embodiment, when the malfunctioned light-emitting elements are L1, L2, and L7 at the same time, or are L1, L2, and L8 at the same time, or are L1, L7, and L8 at the same time, or are L2, L7, and L8 at the same time, the light-emitting element string 202 may still normally work through the third shunt path. In the embodiment, when the malfunctioned light-emitting elements are L5, L6, and L7 at the same time, or are L5, L6, and L8 at the same time, or are L5, L7, and L8 at the same time, or are L6, L7, and L8 at the same time, the light-emitting element string 202 may still normally work through the first shunt path. According to the above description, it is known that when the number of the malfunctioned light-emitting elements is three (i.e. the number of statuses of malfunction is 56), the light-emitting element string 202 may still normally work through the first shunt path, the second shunt path or the third shunt path under the number of statuses of malfunction of 12, i.e. the chance of normal operation of the light-emitting element string 202 is 21%. In brief, even if the number of the malfunctioned light-emitting elements is three, the chance of normal operation of the light-emitting element string 202 is still more than 20%.

For simplicity's sake, only one light-emitting element string 202 is illustrated in the embodiment, though in an actual application, the light source module 102 may include a plurality of light-emitting element strings 202. For example, in an embodiment that is not illustrated, a light-emitting element array formed by a plurality of light-emitting element strings 202 may be connected in parallel between the voltage source used for providing the operation voltage VCC and the control circuit 210, and the control circuit 210 may adjust the shunt circuit corresponding to each of the light-emitting element strings 202 according to the output current of each of the light-emitting element strings 202, so as to make an effective use of the light-emitting element array. Moreover, in some embodiment, the light source module 102 may also store/record the malfunction information of the light-emitting elements in the light-emitting element array to serve as reference information for future maintenance/improvement of the light source module 120 or the projection uppercuts 100.

Figure 3:
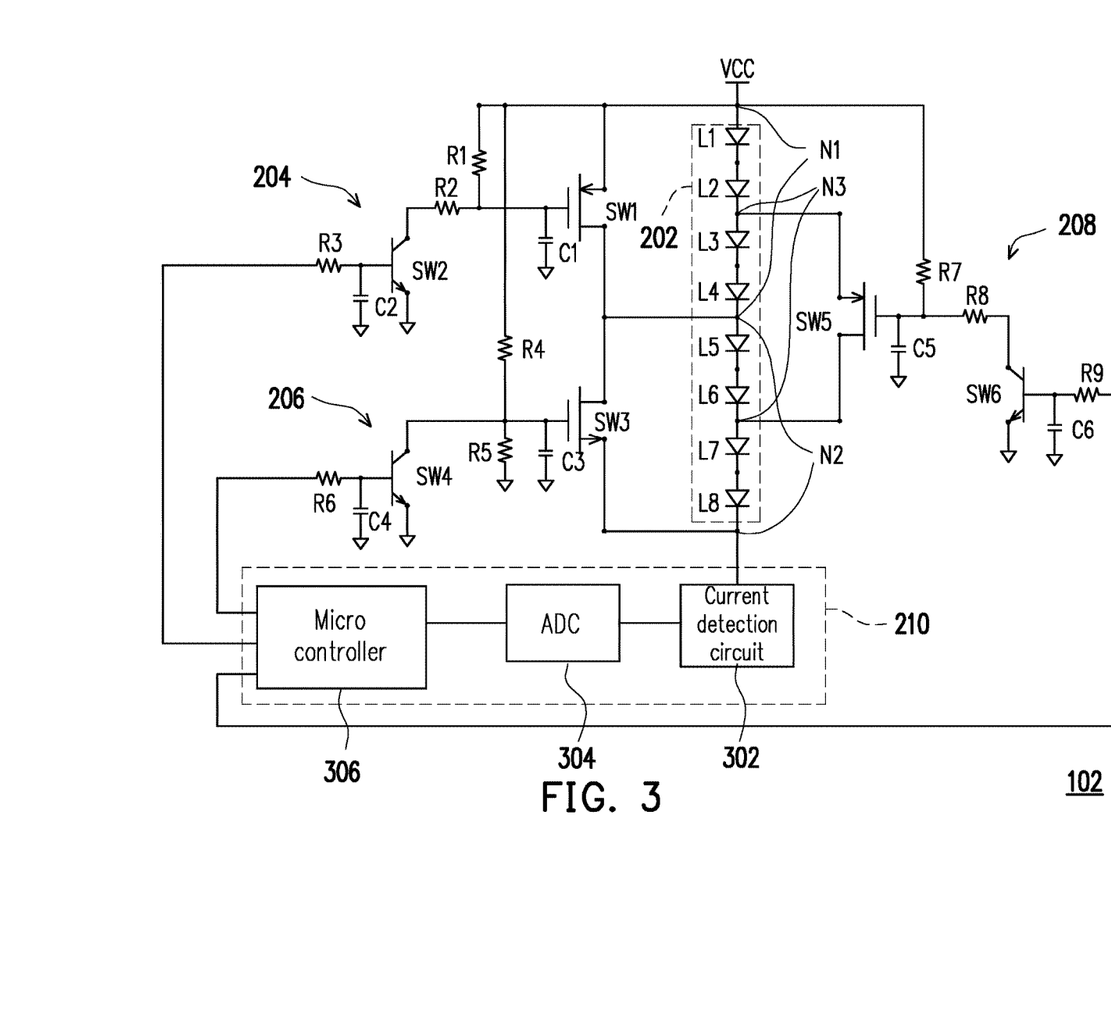
FIG. 3 is a schematic diagram of a light source module according to another embodiment of the invention.

FIG. 3 is a schematic diagram of a light source module according to another embodiment of the invention. Referring to FIG. 3, in the embodiment, the first shunt circuit 204 may include switches SW1, SW2, resistors R1, R2, R3, and capacitors C1, C2; the second shunt circuit 206 may include switches SW3, SW4, resistors R4, R5, R6, and capacitors C3, C4; and the third shunt circuit 208 may include switches SW5, SW6, resistors R7, R8, R9, and capacitors C5, C6. In the embodiment, the switches SW1-SW6 may be implemented by transistors. For example, in the embodiment, the switches SW1, SW3, SW5 are, for example, implemented by metal-oxide-semiconductor field-effect transistors (MOSFET), and the switches SW2, SW4, SW6 are, for example, implemented by bipolar junction transistors (BJT), though the invention is not limited thereto. In the embodiment, by using the BJTs to implement the switches SW2, SW4, SW6, manufacturing cost of the light source module may be reduced. In the embodiment, the switch SW1 is coupled between a pair of first connection nodes N1, and the switch SW2 is coupled between a control terminal of the switch SW1 and a reference ground terminal used for providing a ground voltage. The control circuit 210 may control a turn-on state of the switch SW2, so as to control a turn-on state of the switch SW1 to make the switch SW1 to provide a first shunt path. In the embodiment, the resistor R1 is coupled between the voltage source used for providing the operation voltage VCC and the control terminal of the switch SW1, the resistor R2 is coupled between the control terminal of the switch SW1 and a collector of the switch SW2, and the resistor R3 is coupled between a control terminal of the switch SW2 and the control circuit 210. The capacitor C1 is coupled between the control terminal of the switch SW1 and the reference ground terminal used for providing the ground voltage, and the capacitor C2 is coupled between the control terminal of the switch SW2 and the reference ground terminal used for providing the ground voltage. In the embodiment, the resistors R1, R2 and the capacitor C1 (coupled to the control terminal of the switch SW1) and the resistor R3 and the capacitor C2 (coupled to the control terminal of the switch SW2) may be used for adjusting a bias magnitude of the control terminals of the switches SW1 and SW2 and a delay time of voltage variation, such that when the control circuit 210 provides a voltage to the first shunt circuit 204 to make the switch SW1 to provide the first shunt path, the switches SW1 and SW2 may be indeed turned on/off and have a good turn-on time.

Similarly, in the embodiment, the SW3 is coupled between a pair of second connection nodes N2, and the switch SW4 is coupled between a control terminal of the switch SW3 and the reference ground terminal used for providing the ground voltage. The control circuit 210 may control a turn-on state of the switch SW4, so as to control a turn-on state of the switch SW3 to make the switch SW3 to provide a second shunt path. In the embodiment, the resistor R4 is coupled between the voltage source used for providing the operation voltage VCC and the control terminal of the switch SW3, the resistor R5 is coupled between the control terminal of the switch SW3 and the reference ground terminal used for providing the ground voltage, and the resistor R6 is coupled between a control terminal of the switch SW4 and the control circuit 210. The capacitor C3 is coupled between the control terminal of the switch SW3 and the reference ground terminal used for providing the ground voltage, and the capacitor C4 is coupled between the control terminal of the switch SW4 and the reference ground terminal used for providing the ground voltage. In the embodiment, the resistors R4, R5 and the capacitor C3 (coupled to the control terminal of the switch SW3) and the resistor R6 and the capacitor C4 (coupled to the control terminal of the switch SW4) may be used for adjusting a bias magnitude of the control terminals of the switches SW3 and SW4 and a delay time of voltage variation, such that when the control circuit 210 provides a voltage to the second shunt circuit 206 to make the switch SW3 to provide the second shunt path, the switches SW3 and SW4 may be indeed turned on/off and have a good turn-on time.

Similarly, in the embodiment, the switch SW5 is coupled between a pair of third connection nodes N3, and the switch SW6 is coupled between a control terminal of the switch SW5 and the reference ground terminal used for providing the ground voltage. The control circuit 210 may control a turn-on state of the switch SW6, so as to control a turn-on state of the switch SW5 to make the switch SW5 to provide a third shunt path. In the embodiment, the resistor R7 is coupled between the voltage source used for providing the operation voltage VCC and the control terminal of the switch SW5, the resistor R8 is coupled between the control terminal of the switch SW5 and a collector of the switch SW6, and the resistor R9 is coupled between a control terminal of the switch SW6 and the control circuit 210. The capacitor C5 is coupled between the control terminal of the switch SW5 and the reference ground terminal used for providing the ground voltage, and the capacitor C6 is coupled between the control terminal of the switch SW6 and the reference ground terminal used for providing the ground voltage. In the embodiment, the resistors R7, R8 and the capacitor C5 (coupled to the control terminal of the switch SW5) and the resistor R9 and the capacitor C6 (coupled to the control terminal of the switch SW6) may be used for adjusting a bias magnitude of the control terminals of the switches SW5 and SW6 and a delay time of voltage variation, such that when the control circuit 210 provides a voltage to the third shunt circuit 208 to make the switch SW5 to provide the third shunt path, the switches SW5 and SW6 may be indeed turned on/off and have a good turn-on time. In the embodiment, resistances of the resistors R1-R9 and capacitances of the capacitors C1-C6 may be respectively adjusted according to characteristics of the corresponding shunt paths. In some embodiments, the light source module 102 may not include the resistors R1-R9 and the capacitors C1-C6, which is not limited by the invention.

Moreover, the control circuit 210 of the embodiment may include a current detection circuit 302, an analog to digital converter (ADC) 304, and a micro controller 306. In the embodiment, the current detection circuit 302 is coupled between the light-emitting element string 202 and the ADC 304, the ADC 304 is coupled between the current detection circuit 302 and the micro controller 306, and the micro controller 306 is coupled to the first shunt circuit 204, the second shunt circuit 206, and the third shunt circuit 208. In the embodiment, the micro controller 306 is coupled between the first shunt circuit 204 and the ADC 304, the micro controller 306 is coupled between the second shunt circuit 206 and the ADC 304, and the micro controller 306 is coupled between the third shunt circuit 208 and the ADC 304. In the embodiment, the current detection circuit 302 may detect a current output by the light-emitting element string 202 to output a current detection signal; the ADC 304 may receive the current detection signal from the current detection circuit 302, and convert the current detection signal into a digital signal; and the micro controller 306 may receive the digital signal from the ADC 304 and output a voltage to the switches SW2, SW4, and SW6 according to the digital signal, so as to control the switch SW to provide the first shunt path, or control the switch SW3 to provide the second shunt path, or control the switch SW5 to provide the third shunt path.

Figure 4:
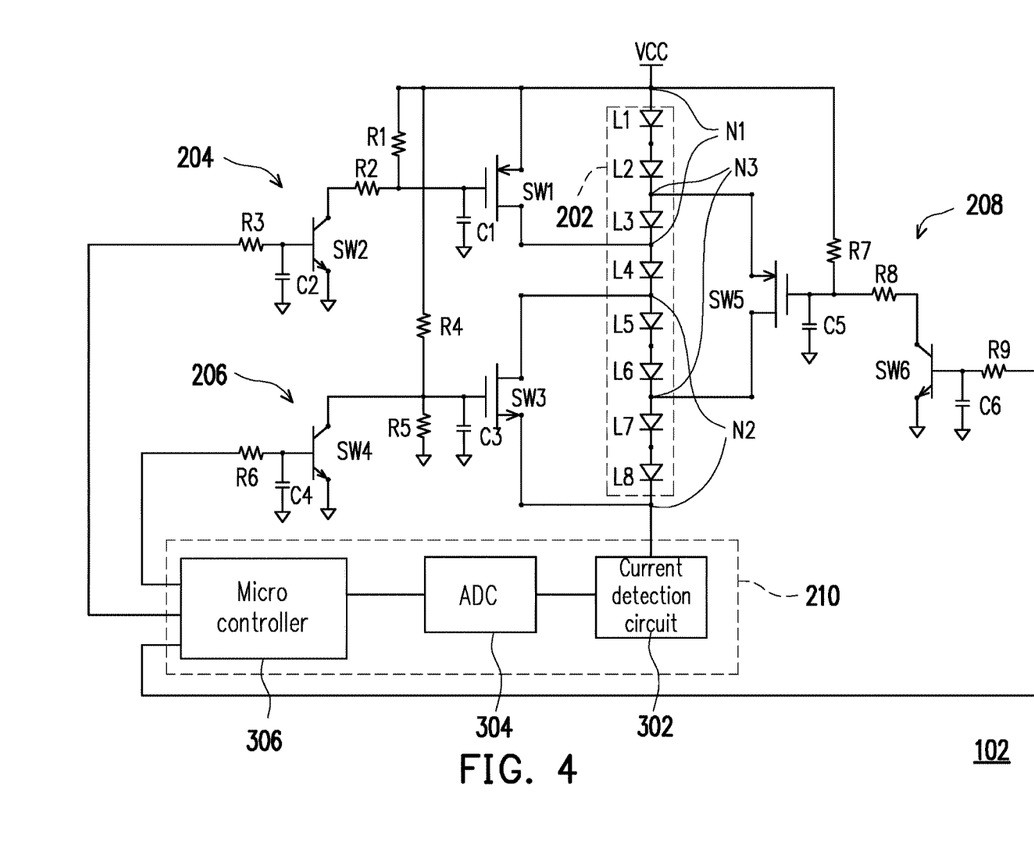
FIG. 4 is a schematic diagram of a light source module according to another embodiment of the invention.

However, the coupling method of the first shunt circuit 204, the second shunt circuit 206, the third shunt circuit 208, and the light-emitting element string 202 is not limited to the methods shown in FIG. 2 and FIG. 3. For example, as long as at least one light-emitting element between the pair of first connection nodes N1, at least one light-emitting element between the pair of second connection nodes N2, and at least one light-emitting element between the pair of third connection nodes N3 are not completely the same, it may serve as the coupling method of the first shunt circuit 204, the second shunt circuit 206, the third shunt circuit 208, and the light-emitting element string 202 of the embodiment. To be specific, FIG. 4 is a schematic diagram of a light source module according to another embodiment of the invention. Referring to FIG. 4, in the embodiment, the first light-emitting portion of the light-emitting element string 202 is composed of the light-emitting elements L1, L2, and L3; the second light-emitting portion of the light-emitting element string 202 is composed of the light-emitting elements L5, L6, L7, and L8; and the third light-emitting portion of the light-emitting element string 202 is composed of the light-emitting elements L3, L4, L5, and L6. The first shunt circuit 204, the second shunt circuit 206, and the third shunt circuit 208 (or referred to as the switch SW1 of the first shunt circuit 204, the switch SW3 of the second shunt circuit 206, and the switch SW5 of the third shunt circuit 208) are respectively coupled in parallel with the first light-emitting portion (the light-emitting elements L1, L2, and L3), the second light-emitting portion (the light-emitting elements L5, L6, L7, and L5), and the third light-emitting portion (the light-emitting elements L3, L4, L5, and L6), so as to form a pair of first connection nodes N1, a pair of second connection nodes N2, and a pair of third connection nodes N3 on the light-emitting element string 202. Similarly, in the embodiment, the control circuit 210 may control the first shunt circuit 204, the second shunt circuit 206 or the third shunt circuit 208 to provide the first shunt path, the second shunt path or the third shunt path according to the output current of the light-emitting element string 202, so as to guide the current to the light-emitting elements of the light-emitting element string 202 that are not malfunctioned, and avoid the situation that all of the light-emitting elements of the light-emitting element string 202 cannot emit light.

Figure 5:
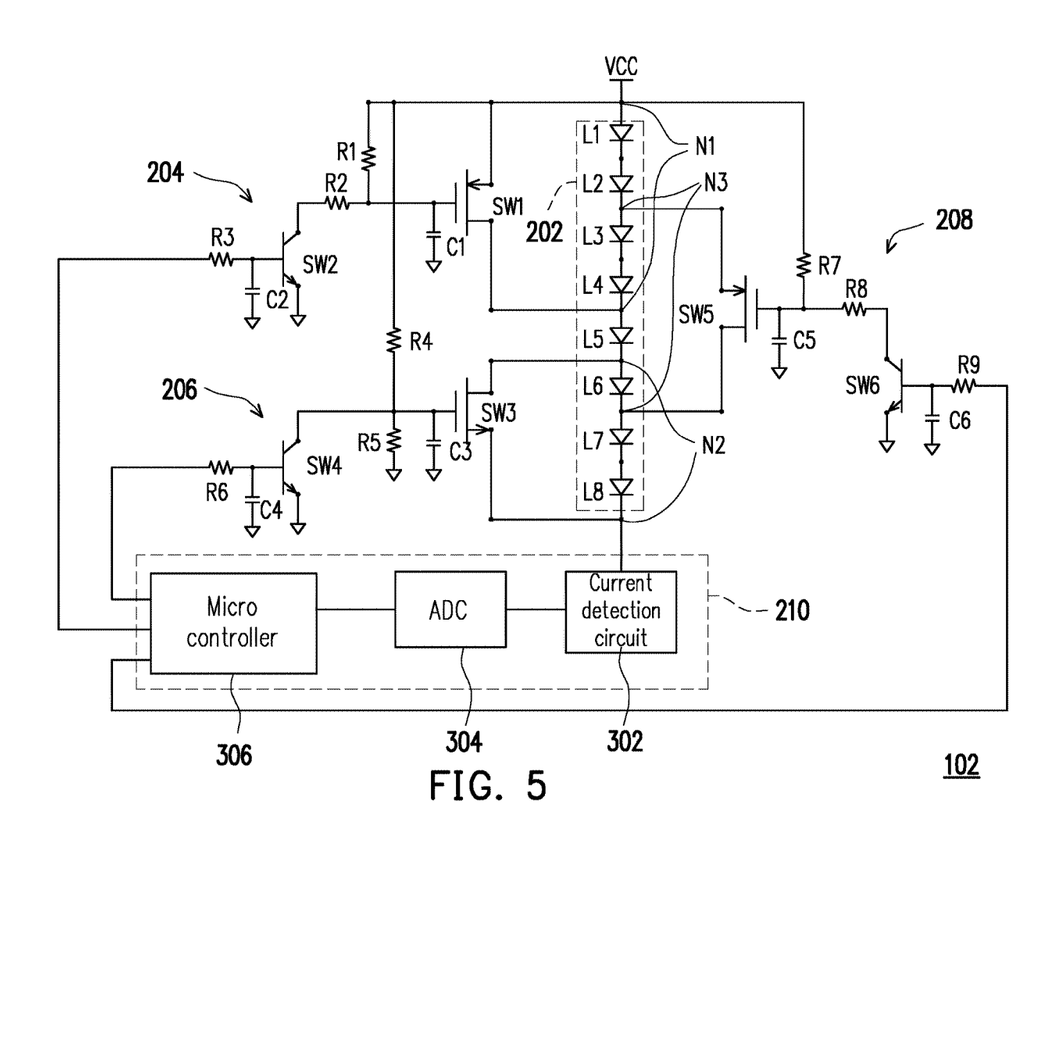
FIG. 5 is a schematic diagram of a light source module according to another embodiment of the invention.

Similarly, FIG. 5 is a schematic diagram of a light source module according to another embodiment of the invention. Referring to FIG. 5, in the embodiment, the first light-emitting portion of the light-emitting element string 202 is composed of the light-emitting elements L1, L2, L3, and L4; the second light-emitting portion of the light-emitting element string 202 is composed of the light-emitting elements L6, L7, and L8; and the third light-emitting portion of the light-emitting element string 202 is composed of the light-emitting elements L3, L4, L5, and L6. The first shunt circuit 204, the second shunt circuit 206, and the third shunt circuit 208 (or referred to as the switch SW1 of the first shunt circuit 204, the switch SW3 of the second shunt circuit 206, and the switch SW5 of the third shunt circuit 208) are respectively coupled in parallel with the first light-emitting portion (the light-emitting elements L1, L2, L3, and L4), the second light-emitting portion (the light-emitting elements L6, L7, and L8), and the third light-emitting portion (the light-emitting elements L3, L4, L5, and L6), so as to form a pair of first connection nodes N1, a pair of second connection nodes N2, and a pair of third connection nodes N3 on the light-emitting element string 202.

Figure 6:
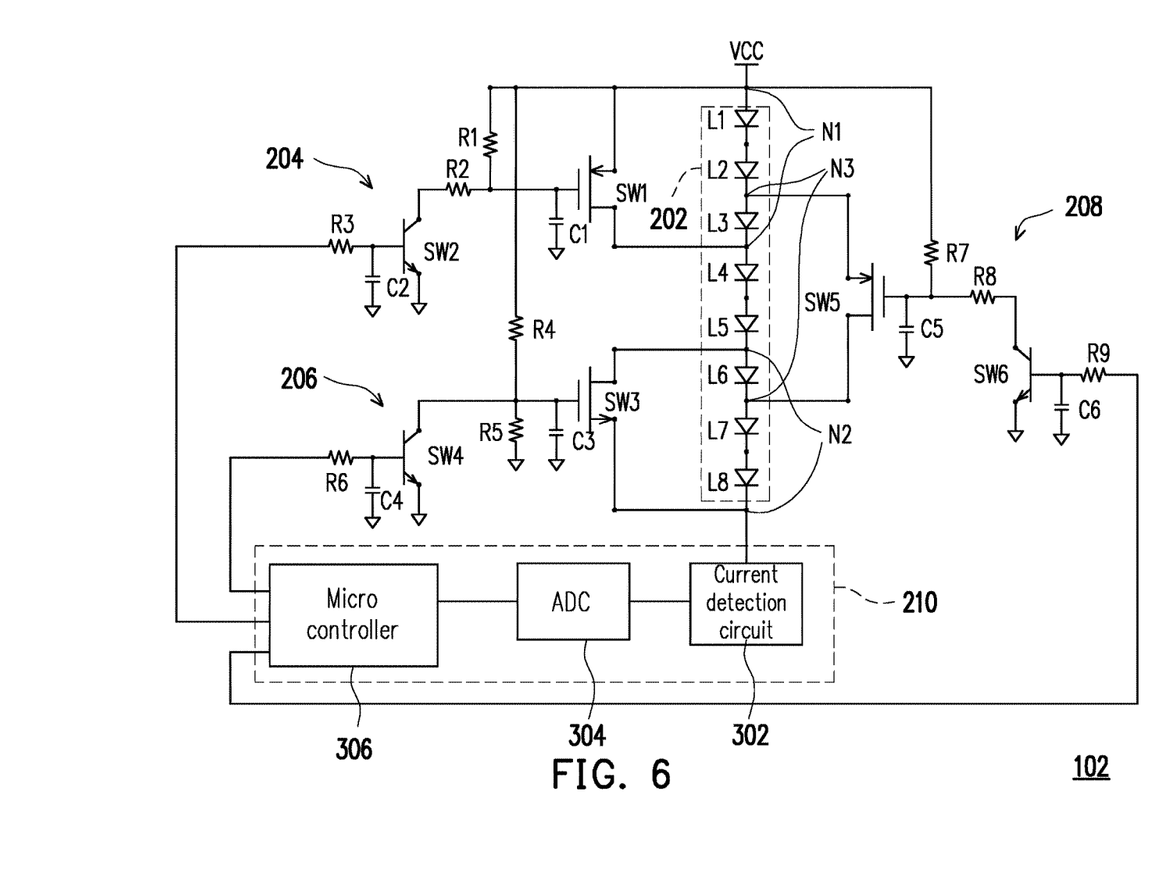
FIG. 6 is a schematic diagram of a light source module according to another embodiment of the invention.

Similarly, FIG. 6 is a schematic diagram of a light source module according to another embodiment of the invention. Referring to FIG. 6, in the embodiment, the first light-emitting portion of the light-emitting element string 202 is composed of the light-emitting elements L1, L2, and L3; the second light-emitting portion of the light-emitting element string 202 is composed of the light-emitting elements L6, L7, and L8; and the third light-emitting portion of the light-emitting element string 202 is composed of the light-emitting elements L3, L4, L5, and L6. The first shunt circuit 204, the second shunt circuit 206, and the third shunt circuit 208 (or referred to as the switch SW1 of the first shunt circuit 204, the switch SW3 of the second shunt circuit 206, and the switch SW5 of the third shunt circuit 208) are respectively coupled in parallel with the first light-emitting portion (the light-emitting elements L1, L2, and L3), the second light-emitting portion (the light-emitting elements L6, L7, and L8), and the third light-emitting portion (the light-emitting elements L3, L4, L5, and L6), so as to form a pair of first connection nodes N1, a pair of second connection nodes N2, and a pair of third connection nodes N3 on the light-emitting element string 202.

Figure 7:
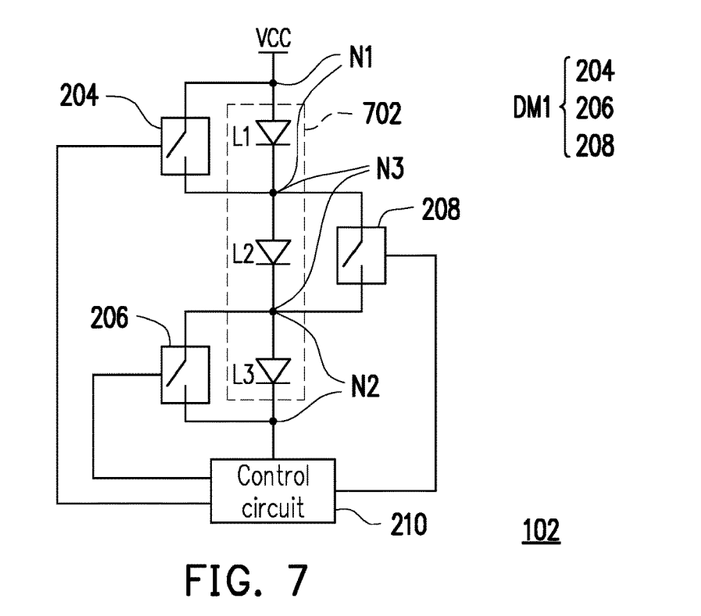
FIG. 7 is a schematic diagram of a light source module according to another embodiment of the invention.
Figure 8:
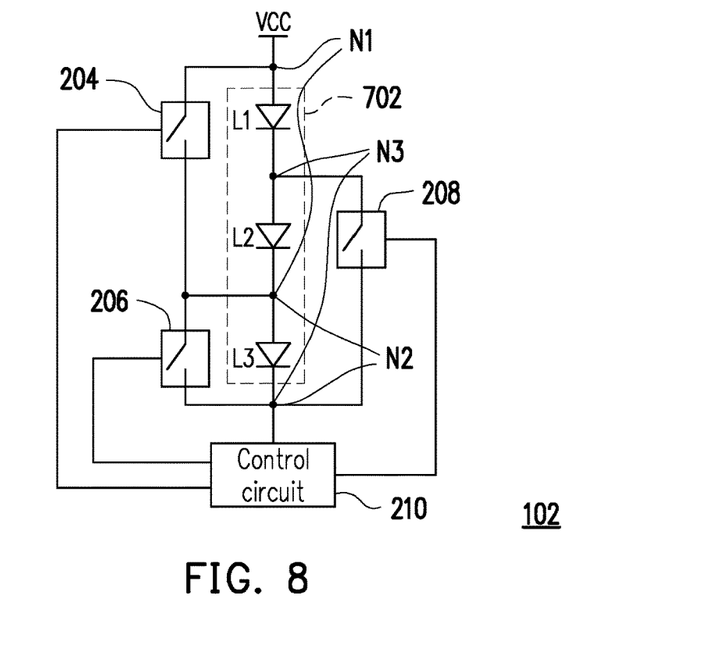
FIG. 8 is a schematic diagram of a light source module according to another embodiment of the invention.
Figure 9:
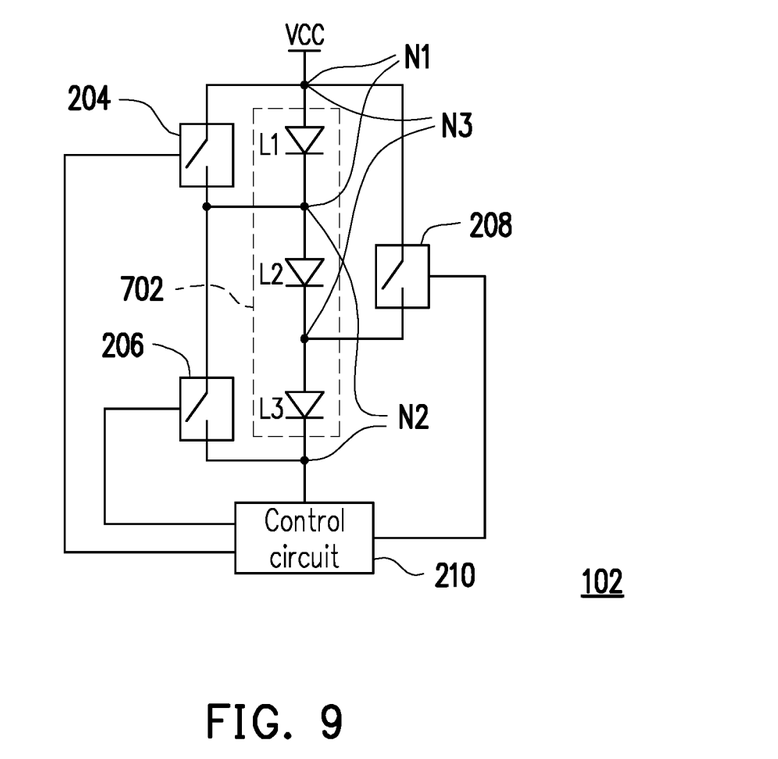
FIG. 9 is a schematic diagram of a light source module according to another embodiment of the invention.

Moreover, in the aforementioned embodiments, although the light-emitting element string 202 having 8 light-emitting elements L1-L8 is taken as an example to describe the light-emitting module 102, the invention is not limited thereto. The light-emitting element string 202 may also include different number of the light-emitting elements. For example, as long as the method for coupling the first shunt circuit 204, the second shunt circuit 206, and the third shunt circuit 208 to the light-emitting element string 202 is that at least one light-emitting element between the pair of first connection nodes N1, at least one light-emitting element between the pair of second connection nodes N2, and at least one light-emitting element between the pair of third connection nodes N3 are not completely the same, it may serve as the embodiment of the invention. To be specific, FIG. 7-FIG. 9 are schematic diagrams of light source modules according to embodiments of the invention. In the embodiment of FIG. 7-FIG. 9, the light-emitting element string 702 includes 3 light-emitting elements L1-L3. In the embodiment of FIG. 7, a first light-emitting portion of a light-emitting element string 702 includes the light-emitting element L1, a second light-emitting portion of the light-emitting element string 702 includes the light-emitting element L3, and a third light-emitting portion of the light-emitting element string 702 includes the light-emitting element L2. In the embodiment of FIG. 8, the first light-emitting portion of the light-emitting element string 702 includes the light-emitting elements L1 and L2; the second light-emitting portion of the light-emitting element string 702 includes the light-emitting element L3; and the third light-emitting portion of the light-emitting element string 702 includes the light-emitting elements L2 and L3. In the embodiment of FIG. 9, the first light-emitting portion of the light-emitting element string 702 includes the light-emitting element L1; the second light-emitting portion of the light-emitting element string 702 includes the light-emitting elements L2 and L3; and the third light-emitting portion of the light-emitting element string 702 includes the light-emitting elements L1 and L2. Similarly, in the embodiments of FIG. 7-FIG. 9, the control circuit 210 may control the first shunt circuit 204, the second shunt circuit 206 or the third shunt circuit 208 to provide the first shunt path, the second shunt path or the third shunt path according to the output current of the light-emitting element string 702, so as to guide the current to the light-emitting elements of the light-emitting element string 202 that are not malfunctioned, and avoid the situation that all of the light-emitting elements of the light-emitting element string 202 cannot emit light due to malfunction of a part of the light-emitting elements. Since the implementation method that the control circuit 210 controls the first shunt circuit 204, the second shunt circuit 206 or the third shunt circuit 208 to provide the first shunt path, the second shunt path or the third shunt path according to the output current of the light-emitting element string 202 have been described in detail in the aforementioned embodiment, those skilled in the art may deduce the implementation of the embodiments of FIG. 7-FIG. 9 according to the aforementioned embodiment, and detailed thereof is not repeated.

Figure 10:
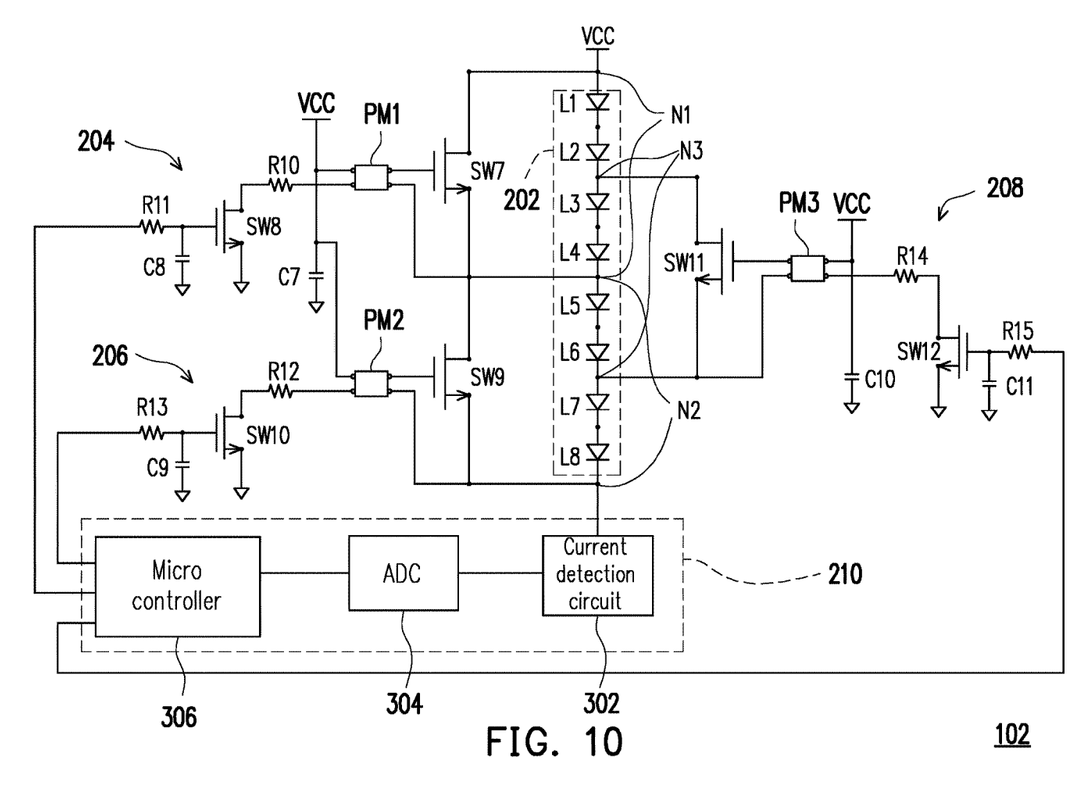
FIG. 10 is a schematic diagram of a light source module according to another embodiment of the invention.

In some embodiments, the first shunt circuit 204 may include MOSFETs and photo transistors (e.g. photo MOS), the second shunt circuit 206 may include MOSFETs and photo transistors, and the third shunt circuit 208 may include MOSFETs and photo transistors. For example, FIG. 10 is a schematic diagram of a light source module according to another embodiment of the invention. In the embodiment, the first shunt circuit 204 may include switches SW7, SW8, a photo transistor PM1, resistors R10, R11, and a capacitor C8; the second shunt circuit 206 may include switches SW9, SW10, resistors R12, R13, and a capacitor C9; and the third shunt circuit 208 may include switches SW11, SW12, resistors R14, R15, and a capacitor C11. In the embodiment, the capacitors C7, C10 are voltage stabilizing capacitors of the operation voltage VCC. In the embodiments, the switches SW7-SW12 are implemented by transistors, and the switches SW7-SW12 are, for example, implemented by N-type MOSFETs, though the invention is not limited thereto. In the embodiment, a coupling relationship of the switches SW7-SW12, the photo transistors PM1-PM3, the resistors R10-R15, the capacitors C7-C11, the control circuit 210, and the light-emitting element string 202 is as shown in FIG. 10. In the embodiment, the micro controller 306 may apply a control voltage to the switches SW8, SW10, and SW12 to control turn-on states of the switches SW7, SW9, and SW11, so as to provide the corresponding shunt path. Similarly, the resistors R10-R5 and the capacitors C7-C11 of the embodiment may be used for adjusting a bias magnitude of the control terminals of each of the switches and a delay time of voltage variation, such that the switches SW7, SW9, and SW11 may be indeed turned on/off and have a good turn-on time to provide the shunt path.

In summary, in the embodiments of the invention, by using the first shunt circuit, the second shunt circuit, and the third shunt circuit coupled to the light-emitting element string to provide the shunt paths to guide the current to the light-emitting elements that are not malfunctioned for emitting light, the problem that the light-emitting element string is unable to provide the light beam due to malfunction of a light-emitting element/light-emitting elements in the light-emitting element string is avoided and/or brightness attenuation caused by malfunction of a light-emitting element/light-emitting elements is mitigated, so as to effectively improve the projection quality of the projection apparatus and the optical quality of the light source module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a light source module, adapted to provide an illumination beam, and comprising:
      a light-emitting element string, having a first light-emitting portion, a second light-emitting portion, and a third light-emitting portion, wherein the first light-emitting portion, the second light-emitting portion, and the third light-emitting portion comprise a plurality of light-emitting elements connected in series;
      a shunt module, coupled to the light-emitting element string, and comprising:
         a first shunt circuit, connected in parallel with the first light-emitting portion to form a pair of first connection nodes on the light-emitting element string, and adapted to provide a first shunt path;
         a second shunt circuit, connected in parallel with the second light-emitting portion to form a pair of second connection nodes on the light-emitting element string, and adapted to provide a second shunt path; and
         a third shunt circuit, connected in parallel with the third light-emitting portion to form a pair of third connection nodes on the light-emitting element string, and adapted to provide a third shunt path, wherein at least one light-emitting element between the pair of the first connection nodes, at least one light-emitting element between the pair of the second connection nodes, and at least one light-emitting element between the pair of the third connection nodes are not completely the same; and
      a control circuit, coupled to the light-emitting element string, the first shunt circuit, the second shunt circuit, and the third shunt circuit, and adapted to control the first shunt circuit, the second shunt circuit or the third shunt circuit to provide the first shunt path, the second shunt path or the third shunt path according to an output current of the light-emitting element string, wherein the light-emitting element string is adapted to provide the illumination beam through the first shunt path, the second shunt path or the third shunt path;
   a light valve, located on a transmission path of the illumination beam, and adapted to convert the illumination beam into an image beam; and
   a projection lens, located on a transmission path of the image beam.

2. The projection apparatus as claimed in claim 1, wherein when the control circuit detects that the output current of the light-emitting element string is zero, the control circuit controls the first shunt circuit, the second shunt circuit or the third shunt circuit to provide the first shunt path, the second shunt path or the third shunt path, such that the at least one light-emitting element between the pair of the first connection nodes, the at least one light-emitting element between the pair of the second connection nodes or the at least one light-emitting element between the pair of the third connection nodes provides the illumination beam.

3. The projection apparatus as claimed in claim 1, wherein the shunt module comprises:
   a first switch, coupled between the pair of the first connection nodes;
   a second switch, coupled between a control terminal of the first switch and a reference ground terminal used for providing a ground voltage, wherein the control circuit is adapted to control a turn-on state of the second switch so as to control a turn-on state of the first switch to make the first switch to provide the first shunt path, wherein the first switch and the second switch belong to the first shunt circuit;
   a third switch, coupled between the pair of the second connection nodes;
   a fourth switch, coupled between a control terminal of the third switch and the reference ground terminal used for providing the ground voltage, wherein the control circuit is adapted to control a turn-on state of the fourth switch so as to control a turn-on state of the third switch to make the third switch to provide the second shunt path, wherein the third switch and the fourth switch belong to the second shunt circuit;
   a fifth switch, coupled between the pair of the third connection nodes; and
   a sixth switch, coupled between a control terminal of the fifth switch and the reference ground terminal used for providing the ground voltage, wherein the control circuit is adapted to control a turn-on state of the sixth switch so as to control a turn-on state of the fifth switch to make the fifth switch to provide the third shunt path, wherein the fifth switch and the sixth switch belong to the third shunt circuit.

4. The projection apparatus as claimed in claim 3, wherein the first switch comprises a first transistor, the second switch comprises a second transistor, the third switch comprises a third transistor, the fourth switch comprises a fourth transistor, the fifth switch comprises a fifth transistor, and the sixth switch comprises a sixth transistor.

5. The projection apparatus as claimed in claim 4, wherein the first transistor, the third transistor, and the fifth transistor respectively comprise a metal-oxide-semiconductor field-effect transistor, and the second transistor, the fourth transistor, and the sixth transistor respectively comprise a bipolar junction transistor.

6. The projection apparatus as claimed in claim 4, wherein the first transistor, the third transistor, and the fifth transistor respectively comprise a photo transistor, and the second transistor, the fourth transistor, and the sixth transistor respectively comprise a metal-oxide-semiconductor field-effect transistor.

7. A light source module, comprising:
   a light-emitting element string, having a first light-emitting portion, a second light-emitting portion, and a third light-emitting portion, wherein the first light-emitting portion, the second light-emitting portion, and the third light-emitting portion comprise a plurality of light-emitting elements connected in series;
   a shunt module, coupled to the light-emitting element string, and comprising:
      a first shunt circuit, connected in parallel with the first light-emitting portion to form a pair of first connection nodes on the light-emitting element string, and adapted to provide a first shunt path;

a second shunt circuit, connected in parallel with the second light-emitting portion to form a pair of second connection nodes on the light-emitting element string, and adapted to provide a second shunt path; and a third shunt circuit, connected in parallel with the third light-emitting portion to form a pair of third connection nodes on the light-emitting element string, and adapted to provide a third shunt path, wherein at least one light-emitting element between the pair of the first connection nodes, at least one light-emitting element between the pair of the second connection nodes, and at least one light-emitting element between the pair of the third connection nodes are not completely the same; and a control circuit, coupled to the light-emitting element string, the first shunt circuit, the second shunt circuit, and the third shunt circuit, and adapted to control the first shunt circuit, the second shunt circuit or the third shunt circuit to provide the first shunt path, the second shunt path or the third shunt path according to an output current of the light-emitting element string.

8. The light source module as claimed in claim 7, wherein when the control circuit detects that the output current of the light-emitting element string is zero, the control circuit controls the first shunt circuit, the second shunt circuit or the third shunt circuit to provide the first shunt path, the second shunt path or the third shunt path.

9. The light source module as claimed in claim 7, wherein the shunt module comprises:

a first switch, coupled between the pair of the first connection nodes;

a second switch, coupled between a control terminal of the first switch and a reference ground terminal used for providing a ground voltage, wherein the control circuit is adapted to control a turn-on state of the second switch so as to control a turn-on state of the first switch to make the first switch to provide the first shunt path, wherein the first switch and the second switch belong to the first shunt circuit;

a third switch, coupled between the pair of the second connection nodes;

a fourth switch, coupled between a control terminal of the third switch and the reference ground terminal used for providing the ground voltage, wherein the control circuit is adapted to control a turn-on state of the fourth switch so as to control a turn-on state of the third switch to make the third switch to provide the second shunt path, wherein the third switch and the fourth switch belong to the second shunt circuit;

a fifth switch, coupled between the pair of the third connection nodes; and a sixth switch, coupled between a control terminal of the fifth switch and the reference ground terminal used for providing the ground voltage, wherein the control circuit is adapted to control a turn-on state of the sixth switch so as to control a turn-on state of the fifth switch to make the fifth switch to provide the third shunt path, wherein the fifth switch and the sixth switch belong to the third shunt circuit.

10. The light source module as claimed in claim 9, wherein the first switch comprises a first transistor, the second switch comprises a second transistor, the third switch comprises a third transistor, the fourth switch comprises a fourth transistor, the fifth switch comprises a fifth transistor, and the sixth switch comprises a sixth transistor.

11. The light source module as claimed in claim 10, wherein the first transistor, the third transistor, and the fifth transistor respectively comprise a metal-oxide-semiconductor field-effect transistor, and the second transistor, the fourth transistor, and the sixth transistor respectively comprise a bipolar junction transistor.

12. The light source module as claimed in claim 10, wherein the first transistor, the third transistor, and the fifth transistor respectively comprise a photo transistor, and the second transistor, the fourth transistor, and the sixth transistor respectively comprise a metal-oxide-semiconductor field-effect transistor.

* * * * *